United States Patent Office 3,487,136
Patented Dec. 30, 1969

---

3,487,136
GASEOUS TREATMENT OF FUSED CAST BASIC REFRACTORY TO PREVENT HYDRATION
Glenn H. Bonner, Louisville, Ky., Robert C. Doman, Painted Post, N.Y., Robert W. Iseli, Anchorage, Ky., and Pellegrino Papa, Horseheads, N.Y., assignors to Corhart Refractories Company, Louisville, Ky., a corporation of Delaware
No Drawing. Filed May 31, 1967, Ser. No. 642,313
Int. Cl. C04b *15/14*
U.S. Cl. 264—82          6 Claims

ABSTRACT OF THE DISCLOSURE

Method for preventing or inhibiting hydroation cracking or disintegration, and for increasing the strength, of fused cast basic refractory where blocks of the fused cast refractory are subjected to a carbon dioxide atmosphere under an absolute pressure of at least 250 pounds per square inch for a period in excess of about 1.5 hour.

---

BACKGROUND OF THE INVENTION

This invention pertains to the manufacture of fused cast basic refractory articles or blocks which are suitable for, inter alia, linings of furnaces employed in basic steelmaking processes. The invention is particularly applicable to fused cast basic refractory containing at least 25 wt. percent MgO. Of particular concern at the present time are such fused cast blocks made from batch mixtures of magnesia and chrome ore providing compositions with principal crystalline phases of periclase (with or without other components in solid solution therewith) and chromium-containing spinel as set forth in U.S. Patents 2,599,566, 2,690,974, 3,132,954 and 3,198,643. Preferably, these refractory articles contain at least 40 wt. percent MgO, at least 12 wt. percent $Cr_2O_3$, at least 5 wt. percent $Al_2O_3$, at least 5 wt. percent FeO, and a total of these four mentioned oxides amounting to at least 82 wt. percent.

While the dense tightly bonded fused structure of fused cast basic refractory provides a greater measure of resistance to hydration cracking and/or deterioration than is found in many unfused refractories of similar basic compositions, nevertheless it has been found from production experience that such greater measure of resistance is not sufficient to provide satisfactory economical recovery of saleable product from the total lot of blocks cast. Moreover, such resistance has been found to be quite erratic and it is accentuated during the warm months of the year. The problem is rendered more acute in the more common situation where the refractory bodies are cast as large billets and then sawed into appropriate shaped refractory articles. Necessarily the sawing must be done with diamond tipped blade with cooling water flowed onto the portion of the block being cut and the diamond tipped blade. As a means of alleviating the problem to a limited extent, the sawed articles were dried by heating to temperatures of about 32–49° C. for a period of about 48 hours and then allowed to cool to room temperature. Even with the added lengthy drying step, the percentage recovery of saleable products has continued to be quite disheartening and erratic.

One of the procedures employed for improving the resistance to hydration cracking and deterioration, as well as loss in strength, of sintered or chemically bonded basic refractories of lower density structure is to subject such refractory bodies to an atmosphere of carbon dioxide at ordinary atmospheric pressure (i.e. one atmosphere or 14.7 p.s.i.) or at slightly elevated pressures of up to two or three atmospheres absolute pressure (i.e. gauge pressure plus ordinary atmospheric pressure). Particularly satisfactory results were obtained with the aforementioned elevated pressure conditions when held for periods of about 5 to 6 hours. These prior procedures are described in U.S. Patent 2,547,323 and in the article by P. Lanser and N. Skalla, Radex Rundschau, 1953, No. 6, pp. 40–43.

Attempts to employ the foregoing carbon dioxide atmosphere treatment for fused cast basic refractory articles were met with highly erratic results and very little improvement in resistance of the articles to hydration cracking and disintegration.

SUMMARY OF THE INVENTION

It has now been discovered that hydration cracking and/or deterioration of fused cast basic refractory articles can be consistently and substantially completely eliminated by subjecting the articles to a gaseous carbon dioxide atmosphere at elevated absolute pressures of at least 100 p.s.i. or more for relatively short periods of time in excess of one hour. This treatment is generally performed with the carbon dioxide atmosphere at ordinary prevailing room temperature or somewhat less than that temperature where the gaseous carbon dioxide has not been brought up to room temperature after being generated from Dry Ice or liquid carbon dioxide. Such temperature is not critical to effectiveness of the treatment. Surprisingly, this treatment provides an additional advantage of materially increasing the room temperature strength of dry treated block rather than merely avoiding any significant loss in such strength. It has also been found that this treatment makes it wholly unnecessary to subject the blocks to a lengthy drying procedure thereby greatly reducing the processing time of the fused cast product. After the carbon dioxide treatment, the wet blocks can be stored or shipped without any further processing. No degradation of the beneficial effects from the treatment have been found in blocks stored for nine months or more.

Very effective results are obtained for fused cast basic refractory block having a wide variety of sizes and shapes when subjected to the carbon dioxide atmosphere at an elevated absolute pressure of at least 250 p.s.i. for at least 1.5 hours. There is no apparent upper pressure limit for effectiveness of this high pressure carbon dioxide treatment of the fused cast basic products. Absolute pressures up to about 815 p.s.i. have been found to provide excellent resistance to hydration cracking and/or deterioration. However, it has been found that an absolute pressure of 350 p.s.i. is quite sufficient for all sizes and shapes of such products. Treatment periods can extend up to 16–20 hours or more, but as a practical matter time periods of up to 2 or 3 hours are entirely satisfactory for fully effective results with most sizes and shapes of products.

In carrying out the treatment, the fused cast blocks are loaded into an appropriate pressure vessel so that each block has a maximum amount of its surface area exposed to be contacted by the carbon dioxide atmosphere. After the pressure vessel is closed and sealed, carbon dioxide is introduced into the vessel under pressure sufficient to provide the necessary and desired pressure in the vessel for the treatment. The source of carbon dioxide gas may be any suitable type of carbon dioxide generator capable of supplying the gas under the needed pressure and employing Dry Ice, which is converted to gaseous carbon dioxide by means of a heating coil carrying steam and highly heated water. Alternatively, the generator can be supplied with liquid carbon dioxide, which has been converted to pressurized gaseous carbon dioxide by means of a similar coil containing steam or highly heated water. After the loaded pressure vessel has been pressurized with the carbon dioxide, it is preferable to purge it by releasing the carbon dioxide from the pressure vessel because it is desirable to remove the air component of the atmosphere initially in the vessel when it was closed and sealed. This purge makes it possible to have a high purity carbon dioxide atmosphere in the vessel upon repressurizing the vessel with carbon dioxide to the appropriate pressure. As an alternative purge procedure, the pressure vessel can be evacuated by means of a vacuum pump connected to the pressure vessel. Thus, after the pressure vessel has been initially closed and sealed, the air atmosphere originally present in the chamber is evacuated (e.g. until a vacuum of about 28 inches of mercury is created in the chamber), at which point a suitable valve in the connecting line to the vacuum pump is closed off to seal the pressurized chamber. Then the pressurized carbon dioxide is admitted through another suitable connection into the pressure vessel as described before. After the appropriate time period of treatment has elapsed, the pressurized carbon dioxide atmosphere in the vessel is released through an exhaust valve and conduit, and the vessel is opened to remove the treated blocks. If wet blocks are initially loaded into the pressure vessel, an appropriate space is provided near the bottom of the vessel for water to collect during the period of treatment. After the vessel is opened at the end of the treatment, the water is drained out. However, it is not necessary that the blocks be wet when loaded into the pressure vessel in order for the treatment to be effective.

The carbon dioxide released from the pressure vessel after the treatment can be recovered in a suitable storage apparatus for reuse in another treatment cycle or it may be transferred through appropriate conduits and valves to another pressure vessel for treatment therein of another load of blocks. In the latter case, it will usually be necessary to supplement the other pressure vessel atmosphere with additional pressurized carbon dioxide to generate the needed pressure in the vessel for treatment.

DESCRIPTION OF THE PREFERRED EMBODIMENTS

Example 1

A group of 212 skew blocks were sawed from large fused cast billets made from a molten mixture of magnesia and chrome ore. These blocks had the following average composition by weight: 56.0% MgO, 20.0% $Cr_2O_3$, 10.9% FeO, 8.0% $Al_2O_3$, 2.25% $SiO_2$, 1.5% $TiO_2$, 0.45% CaO, 0.3% fluorine. The principal crystalline phases were periclase solid solution and chromium-containing spinel. The triangular dimensions of the large faces of these skew blocks were 20 inches by 12 inches by 24 inches and the thickness of the blocks was 6 inches. These 212 blocks were divided into two groups: 147 blocks for carbon dioxide treatment and 65 blocks for the old drying treatment. The 147 blocks were taken wet after being sawed and placed in a pressure vessel which was closed and sealed. The vessel was charged with carbon dioxide at a gauge pressure of 300 p.s.i. from a generator employing Dry Ice. After 15 minutes, the vessel was purged by discharging the carbon dioxide atmosphere to a vessel gauge pressure of 150 p.s.i. Then the vessel was immediately recharged with carbon dioxide to a gauge pressure of 300 p.s.i. The vessel was held at the latter pressure for an additional one hour and 45 minutes, after which the carbon dioxide was discharged from the vessel and the vessel was opened to remove the blocks. Upon inspection, only three blocks (2.0%) were found to have cracks. The 65 blocks were taken wet after being sawed and placed in an oven where they were continuously heated for 48 hours at temperatures ranging from 32° C. up to 49° C. in incremental 5.6° C. steps every 12 hours. At the end of the 48 hour heat treatment, the blocks were cooled to room temperature and inspected. Forty-two blocks (64.6%) were found to be cracked. The results in this example clearly illustrate effectiveness of the present invention in almost completely eliminating hydration cracking of the carbon dioxide treated blocks in contradistinction to blocks that were not treated with the high pressure carbon dioxide atmosphere.

Example 2

A series of 402 key blocks were manufactured in the same manner and had the same average composition as in Example 1. Each key block had a length of 13½″, a thickness of 6″ and a width uniformly decreasing from 6″ at one end to 5″ at the opposite end. Two hundred six of these blocks were given the carbon dioxide treatment as in Example 1 and upon subsequent examination only two blocks (1%) were found to have cracked. The remaining 196 blocks were oven dried as in Example 1 and 42 of these blocks (21.4%) were found to be cracked upon inspection. The results in this example show the consistently improved results of almost completely eliminating hydration cracking of the fused basic product by means of the high pressure carbon dioxide treatment.

Example 3

Another series of 144 blocks were made over a 30 day period in the same manner and having the same average composition as in Example 1. One-half of these blocks were subjected to the high pressure carbon dioxide treatment as in Example 1 and the remaining 72 blocks were oven dried as in Example 1. After being subjected to the carbon dioxide treatment or being oven dried, all of the blocks were then subjected to a hot water treatment. This treatment is an accelerated hydration test. The hot water treatment consisted of immersing the blocks for a period of 12 hours in water maintained at 93–99° C. At the end of the 12 hour period, the blocks are visually examined and given a rating of from 1 to 10 according to an arbitrary scale where 10 indicates that no cracking or disintegration is observable in the tested block and one indicates that the block has completely disintegrated to mud or powder in the bottom of the water container. The rating numbers progressively decreasing from 10 down to 1 indicate an observation of increasing amount of cracking and disintegration at the end of the test. The results of the hot water test of these 144 blocks are given in Table I. Each entry in the table represents six blocks tested on the same day and the rating values are the average value of the results observed for the six blocks. The lowest and highest rating of individual blocks for each group of six blocks tested are indicated under the column Range. The length and width dimensions of the blocks in each group of six blocks are given in Table I. All blocks had a thickness of 6″. The data in Table I illustrates the effectiveness of the present invention treatment in quite consistently providing the blocks and immunity to the detrimental effect of hydration. In contrast, it can be seen that those blocks which were not given the high pressure $CO_2$ treatment, but were merely oven dried, yielded very erratic and poor immunity to the effect of the hydration test.

TABLE I

| High pressure $CO_2$ treatment | | Oven dried | | |
|---|---|---|---|---|
| Size (in.) | Rating | Range | Size (in.) | Rating | Range |
| 13½ x (6–5) | 10 | 10–10 | 16½ x (4½–4¼) | 7.7 | 2–10 |
| 15 x (6–5) | 10 | 10–10 | 16½ x (4½–4¼) | 5.7 | 2–10 |
| 15 x (6–5) | 10 | 10–10 | 16½ x (4½–4) | 8.7 | 3–10 |
| 16 x (4½–4¼) | 10 | 10–10 | 16½ x (4½–4) | 8.7 | 2–10 |
| 18 x (6–4) | 10 | 10–10 | 16½ x (4½–4) | 8.3 | 2–10 |
| 12 x (6–5) | 10 | 10–10 | 18 x (4½–3¾) | 5.3 | 2–10 |
| 18 x (4½–3¾) | 10 | 10–10 | 16½ x (4½–4¼) | 7.5 | 2–10 |
| 16 x (4½–4¼) | 8.8 | 3–10 | 16½ x 1¼ | 4.7 | 2–10 |
| 13½ x (6–5) | 10 | 10–10 | 18 x (4½–4¼) | 2 | 2–2 |
| 16½ x (4½–4¼) | 10 | 10–10 | 18 x (4½–4¼) | 6 | 2–10 |
| 16½ x (4½–4¼) | 10 | 10–10 | 18 x (4½–4¼) | 7.2 | 3–10 |
| 15 x (4½–3¾) | 9.3 | 6–10 | 16½ x (4½–4¼) | 6.2 | 2–10 |

Example 4

A series of 144 wedge blocks were made in the manner and having the same average composition as in Example 1. These blocks had a length of 18", a thickness of 6" and a width uniformly decreasing from 4½" at one end to 4" at the opposite end. One-half of these blocks were subjected to the high pressure $CO_2$ treatment as in Example 1 and the remaining 72 blocks were merely oven dried as in Example 1. The blocks from each of the $CO_2$ treatment and the oven drying procedure were grouped in 9 lots of 8 blocks each and stored for periods of 1 to 9 months. At the end of one month of storage, the density (in pounds per cubic foot) and modulus of rupture in flexure (in pounds per square inch) were determined for each block in one 8 block group subjected to the $CO_2$ treatment and in one 8 block group that was merely oven dried. Similar determinations were made at the end of each succeeding monthly period up to a total of 9 months for one 8 block group subjected to the $CO_2$ treatment and for one 8 block group merely oven dried. The average values of density and modulus of rupture (MOR) for each 8 block group are given in Table II. The data illustrates that the high pressure $CO_2$ treatment effectively provides immunity from hydration that is retainable for extended periods of time. This is evident from the fact that the modulus of rupture does not deteriorate as is commonly the case with basic refractory materials that are not given any hydration immunization treatment. The data in Table II also shows the additional effectiveness of the high pressure $CO_2$ treatment in materially increasing the strength (modulus of rupture) of the fused cast basic products. This can be readily seen from the contrasting strength data for the oven dried blocks.

TABLE II

| Number of months | $CO_2$ treated | | Oven dried | |
|---|---|---|---|---|
| | Density, pcf. | MOR, p.s.i. | Density, pcf. | MOR, p.s.i. |
| 1 | 198 | 1,459 | 194 | 806 |
| 2 | 194 | 1,307 | 195 | 775 |
| 3 | 194 | 1,255 | 194 | 680 |
| 4 | 198 | 1,558 | 198 | 775 |
| 5 | 186 | 1,301 | 188 | 622 |
| 6 | 191 | 1,212 | 185 | 950 |
| 7 | 193 | 1,795 | 192 | 1,239 |
| 8 | 194 | 1,698 | 194 | 1,093 |
| 9 | 195 | 1,604 | 196 | 1,051 |

Example 5

Six wedge blocks were made in the same manner and having the same average composition as in Example 1. These blocks had a length of 16½", a thickness of 6" and a width uniformly decreasing from 4½" at one end to 4" at the opposite end. All of these blocks were oven dried after being sawed. Three of these blocks were then subjected to the high pressure $CO_2$ treatment as in Example 1. No further treatment was given to the remaining three blocks. All six blocks were subjected to the hot water hydration test. All three $CO_2$ treated blocks survived the 12 hour hot water treatment without developing any cracks. Of the remaining three blocks that did not have the $CO_2$ treatment, only one survived the 12 hour test without cracks. The other two blocks developed cracks after 8 and 9 hours in the hot water, respectively. These data indicate that the high pressure $CO_2$ treatment is effective for treating dry blocks as well as wet blocks.

Example 6

Seventeen key blocks were made in the same manner and having the same average composition as in Example 1. These blocks had a length of 12", a thickness of 6" and a width uniformly decreasing from 6" at one end to 5" at the opposite end. All 17 blocks were subjected to the high pressure $CO_2$ treatment as in Example 1 except for the fact that the time of $CO_2$ treatment was reduced to only one hour. After they were subjected to the hot water hydration treatment, only 9 blocks were found to survice 12 hours or more in the hot water without cracking. All of the remaining 8 blocks cracked prior to the end of 12 hours in the hot water. These data indicate the erratic results that occur with insufficient time of treatment in the high pressure $CO_2$ atmosphere. Similar tests employing the high pressure $CO_2$ treatment for 1½ hours showed much more consistent effective results in providing immunity to hydration deterioration and cracking.

Example 7

Eight blocks were made in the manner and having the same average composition as in Example 1. The dimensions of these blocks were 18" long, 6" wide and 6" thick. Two blocks were merely oven dried while the remaining six blocks were subjected to a high pressure $CO_2$ treatment as in Example 1 except for the fact that the $CO_2$ gauge pressure was reduced to 250 p.s.i. during the two hours of treatment. After subjecting all of these blocks to the hot water hydration test, the two oven dried blocks were found to have cracked after one hour and seven hours, respectively, while five of the $CO_2$ treated blocks survived 20 hours without any cracking. The sixth $CO_2$ treated block was found to have cracked after 11 hours in the hot water. These data indicate that the slightly lower $CO_2$ gauge pressure of 250 p.s.i. is effective for immunizing even heavier cross-section blocks.

Example 8

Ten blocks were made in the same manner and having the same average composition as in Example 1. Four of the blocks had dimensions of 13½" long, 9¼" wide and 6" thick. The other six blocks had large triangular faces measuring 18" x 13" x 13" and had a thickness of 6". All ten wet sawed blocks were subjected to $CO_2$ atmosphere at 800 p.s.i. gauge pressure for 16 hours. The pressure vessel was purged to 400 p.s.i. after ½ hour duration and then the vessel was immediately recharged to 800 p.s.i. All ten blocks survived 20.5 hours in the hot water hydration test without developing any crack or undergoing any disintegration.

The significant difference between the present invention and prior $CO_2$ treatment at lower pressures was demonstrated with a series of 11 wedge and key blocks of various sizes manufactured in the same manner and having the same average composition as in Example 1. These 11 blocks were subjected to a $CO_2$ atmosphere at an absolute pressure of about 1 atmosphere for times varying from ½ to 18 hours. Only five blocks survived 12 hours in the hot water hydration test without cracking while the remaining six blocks developed cracks at times less than 12 hours in the hot water. Such erratic results are comparable to those obtained with blocks that were merely oven dried and not subjected to any $CO_2$ atmosphere treatment.

While the invention has been specifically illustrated with treated blocks of fused cast chrome-ore-magnesia compositions, it is also applicable to treating other fused cast basic refractory compositions, e.g. those described in U.S. Patents 3,250,632, 3,281,137 and 3,310,414.

We claim:
1. A method for inhibiting hydration deterioration and for increasing the strength of a fused cast basic refractory article containing at least 25 wt. percent MO, comprising subjecting said article to a gaseous carbon dioxide atmosphere at temperatures up to room temperature and at absolute pressures in the range of 250 to 815 p.s.i. for a period of at least about 1.5 hours in a pressure vessel from which the air is substantially removed in the initial stage of the treatment of said article.

2. The method of claim 1 wherein said fused cast basic refractory article is made from a batch mixture of magnesia and chrome ore.

3. The method of claim 2 wherein said article contains at least 40 wt. percent MgO, at least 12 wt. percent $Cr_2O_3$, at least 5 wt. percent $Al_2O_3$, at least 5 wt. percent FeO, and a total of these four oxides amounting to at least 82 wt. percent.

4. The method of claim 1 wherein said article is subjected to a gaseous carbon dioxide atmosphere at an elevated absolute pressure of at least 250 p.s.i. for at least 1.5 hours.

5. The method of claim 4 wherein said article is subjected to a gaseous carbon dioxide atmosphere at elevated absolute pressure in the range of 250 to 815 p.s.i. for a period of 1.5 to 20 hours.

6. A method of claim 5 wherein said article is subjected to a gaseous carbon dioxide atmosphere at elevated absolute pressure in the range of 250 to 350 p.s.i. for a period of 1.5 to 3 hours.

References Cited

UNITED STATES PATENTS

| | | | |
|---|---|---|---|
| 2,547,323 | 4/1951 | Heuer | 264—82 |
| 2,639,993 | 5/1953 | Heuer | 264—82 |

FOREIGN PATENTS 785,823   5/1968   Canada.

JULIUS FROME, Primary Examiner

JOHN H. MILLER, Assistant Examiner

U.S. Cl. X.R.

106—58, 59; 264—65, 340